United States Patent
Koenig et al.

(10) Patent No.: US 10,239,623 B2
(45) Date of Patent: Mar. 26, 2019

(54) AIRCRAFT AIR CONDITIONING SYSTEM AND METHOD OF OPERATING AN AIRCRAFT AIR CONDITIONING SYSTEM

(71) Applicant: Airbus Operations GmbH, Hamburg (DE)

(72) Inventors: Markus Koenig, Hamburg (DE); Paul Chen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 605 days.

(21) Appl. No.: 14/527,473

(22) Filed: Oct. 29, 2014

(65) Prior Publication Data
US 2015/0121909 A1 May 7, 2015

(30) Foreign Application Priority Data
Nov. 4, 2013 (EP) ..................................... 13191378

(51) Int. Cl.
*F28D 5/00* (2006.01)
*B64D 13/06* (2006.01)

(52) U.S. Cl.
CPC ...... *B64D 13/06* (2013.01); *B64D 2013/0618* (2013.01); *B64D 2013/0662* (2013.01); *Y02T 50/56* (2013.01)

(58) Field of Classification Search
CPC ............ B64D 13/06; B64D 2013/0618; B64D 2013/0662; Y02T 50/56
USPC ........................................................ 62/310
See application file for complete search history.

(56) References Cited

U.S. PATENT DOCUMENTS

| | | | |
|---|---|---|---|
| 3,177,679 A * | 4/1965 | Quick ................... | B64D 13/06 454/71 |
| 4,829,775 A | 5/1989 | DeFrancesco | |
| 4,963,174 A | 10/1990 | Payne | |
| 5,402,967 A * | 4/1995 | Hughes .................. | B64D 13/06 169/62 |
| 5,490,645 A * | 2/1996 | Woodhouse ........... | B64D 13/06 244/118.5 |

(Continued)

FOREIGN PATENT DOCUMENTS

| | | |
|---|---|---|
| DE | 102008053320 | 5/2010 |
| DE | 102010054448 | 6/2012 |

(Continued)

OTHER PUBLICATIONS

European Search Report, dated May 13, 2014.

*Primary Examiner* — Filip Zec
(74) *Attorney, Agent, or Firm* — Greer, Burns & Crain, Ltd.

(57) ABSTRACT

An aircraft air conditioning system including a process air line having a first end connected to a process air source to allow a flow of process air therethrough. A ram air channel of the air conditioning system allows ambient air flow therethrough. A heat exchanger unit is disposed in the process air line and arranged within the ram air channel to thermally couple process air flowing through the process air line to ambient air flowing through the ram air channel. A water extractor disposed in the process air line downstream of the heat exchanger unit extracts water from the process air. A water supply system supplies extracted water into the ram air channel. The water supply system has a control arrangement to control a fluid connection between the water extractor and the ram air channel in dependence on an operating state of the aircraft air conditioning system.

20 Claims, 1 Drawing Sheet

(56) References Cited

U.S. PATENT DOCUMENTS

| | | | | |
|---|---|---|---|---|
| 5,511,385 | A * | 4/1996 | Drew | B64D 13/06 62/172 |
| 5,860,283 | A * | 1/1999 | Coleman | B64D 13/06 62/402 |
| 6,381,969 | B1 * | 5/2002 | Afeiche | B64D 13/06 62/87 |
| 6,460,353 | B2 * | 10/2002 | Udobot | B64D 13/06 62/275 |
| 6,662,821 | B2 * | 12/2003 | Jacobsen | F16K 31/05 137/2 |
| 6,848,261 | B2 * | 2/2005 | Claeys | B64D 13/06 62/259.2 |
| 7,797,962 | B2 * | 9/2010 | Kresser | B64D 13/06 62/401 |
| 9,617,004 | B2 * | 4/2017 | Dannenberg | B64D 11/02 |
| 2001/0004837 | A1 | 6/2001 | Sauterleute | |
| 2003/0084681 | A1 * | 5/2003 | Haas | B64D 13/06 62/402 |
| 2003/0177781 | A1 * | 9/2003 | Haas | B64D 13/06 62/402 |
| 2008/0110193 | A1 * | 5/2008 | Jonqueres | B64D 13/06 62/331 |
| 2010/0101251 | A1 | 4/2010 | Kelnhofer | |
| 2012/0255711 | A1 * | 10/2012 | Andres | B64D 13/06 165/104.31 |

FOREIGN PATENT DOCUMENTS

| | | |
|---|---|---|
| EP | 1386837 | 2/2004 |
| WO | 2012079756 | 6/2012 |

* cited by examiner

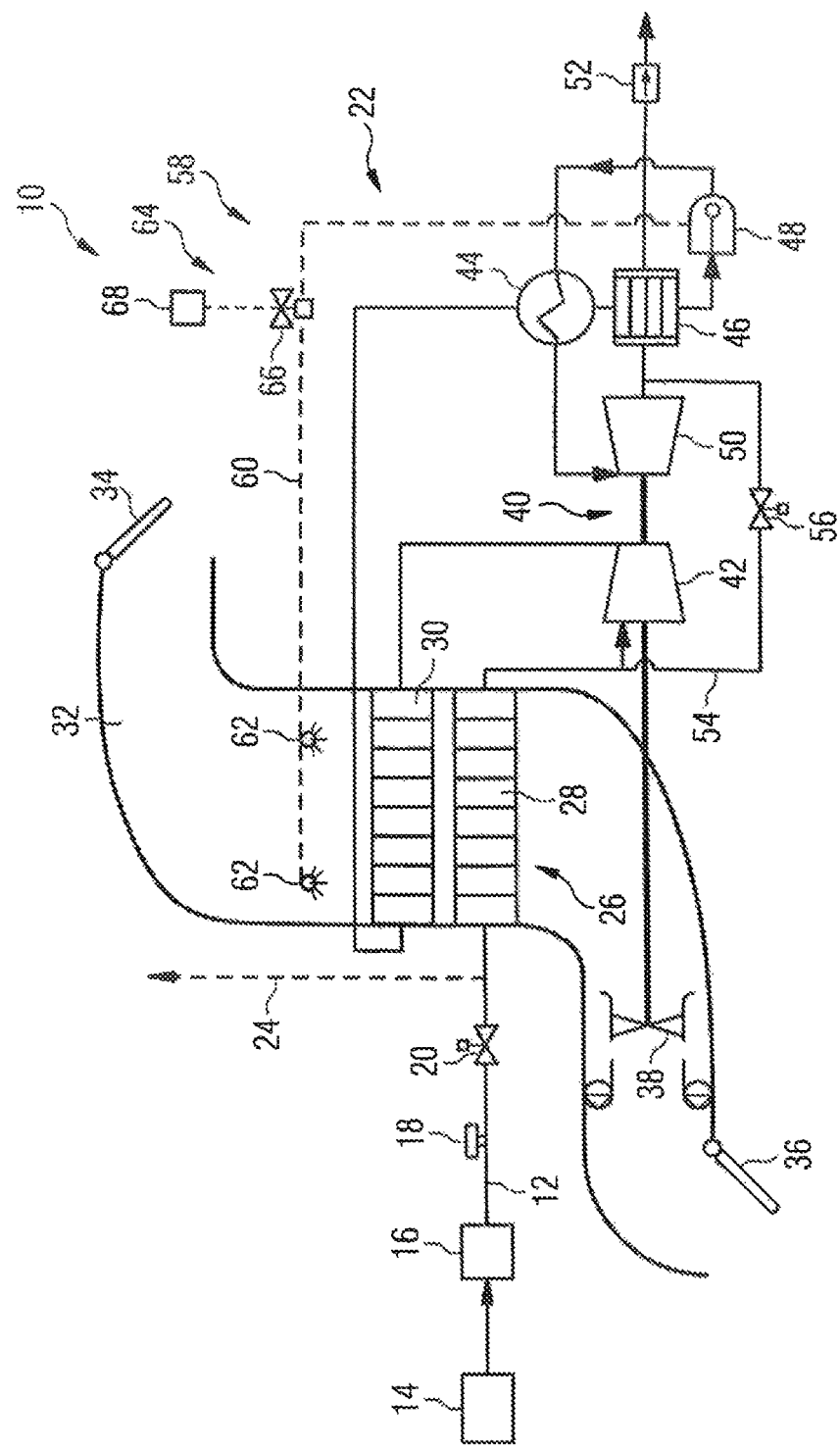

AIRCRAFT AIR CONDITIONING SYSTEM AND METHOD OF OPERATING AN AIRCRAFT AIR CONDITIONING SYSTEM

CROSS-REFERENCES TO RELATED APPLICATIONS

This application claims the benefit of the European patent application No. 13191378.2 filed on Nov. 4, 2013, the entire disclosures of which are incorporated herein by way of reference.

BACKGROUND OF THE INVENTION

The present invention relates to an aircraft air conditioning system and a method for operating an aircraft air conditioning system.

So-called air-based air conditioning systems, as described for example in DE 10 2008 053 320 A1 and US 2010/101251 A1 or DE 10 2010 054 448 A1 and WO 2012/079756 A2, are used at present in commercial aircraft to air-condition the aircraft cabin. An aircraft air conditioning system serves to adequately cool or heat the aircraft cabin and to adequately supply fresh air into the aircraft cabin to ensure that a prescribed minimum proportion of oxygen is present in the aircraft cabin. Further, the humidity within the aircraft cabin is adjusted by means of the aircraft air conditioning system. Moreover, during flight operation of the aircraft, the aircraft air conditioning system is used to pressurize the aircraft cabin so as to maintain the pressure within the aircraft cabin, compared to the ambient pressure at the cruising altitude of the aircraft, at an elevated level.

Air-based air conditioning systems typically comprise an air conditioning unit which is supplied with compressed process air that is bled off from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft, the air conditioning unit of the aircraft air conditioning system, however, typically is supplied with compressed process air from the APU of the aircraft. In the air conditioning unit, the process air, upon flowing through at least one heat exchanger as well as through various compression and expansion units, is cooled and expanded. Cooled process air exiting the air conditioning unit finally is supplied to a mixing chamber where it is mixed with recirculation air recirculated from an aircraft region to be air conditioned. The mixed air from the mixing chamber, via respective mixed air lines, is supplied to the aircraft region to be air conditioned which may be divided into a plurality of air conditioning zones.

SUMMARY OF THE INVENTION

The invention is directed at an object of specifying an aircraft air conditioning system, which allows a reduction of the process air consumption of an air conditioning unit of the aircraft air conditioning system. Further, the invention is directed at an object of providing a method of operating an aircraft air conditioning system of this kind.

An aircraft air conditioning system according to the invention comprises a process air line having a first end connectable to a process air source. The process air source might be any source which is suitable to provide compressed process air suitable to be further processed in an air conditioning unit of the aircraft air conditioning system. For example, the process air source may be an engine or an APU of an aircraft equipped with the aircraft air conditioning system. The process air line allows a flow of process air supplied from the process air source therethrough. During operation of the aircraft air conditioning system, compressed process air flows through the process air line which is bled off, for example, from the engine or the APU of the aircraft equipped with the aircraft air conditioning system. Preferably, the process air line extends through the air conditioning unit of the air conditioning system such that the process air flowing through the process air line, upon being processed within various components of the air conditioning unit is compressed, expanded, heated or cooled and finally exits the air conditioning unit as cooled and expanded process air which may be supplied to a mixing chamber of the air conditioning system.

The aircraft air conditioning system further comprises a ram air channel allowing a flow of ambient air therethrough. The ram air channel may comprise at least one of a ram air channel inlet flap and a ram air channel outlet flap for controlling the flow of ambient air through the ram air channel. In particular, the flow of ambient air through the ram air channel may be controlled as desired by suitably opening and/or closing the ram air channel inlet flap and/or the ram air channel outlet flap. During flight operation of the aircraft equipped with the aircraft air conditioning system, the flow of ambient air through the ram air channel may be induced exclusively by a ram pressure developing, for example, in an inlet region of the ram air channel. In order to ensure a sufficient flow of ambient air through the ram air channel also during ground operation of the aircraft, a conveying device, for example a blower, may be disposed in the ram air channel.

The aircraft air conditioning system further comprises a heat exchanger unit which is disposed in the process air line and arranged within the ram air channel so as to thermally couple the process air flowing through the air line with the ambient air flowing through the ram air channel. In particular, the process air flowing through the process air line, upon being guided through the heat exchanger unit, may be cooled due to the transfer of thermal energy from the process air flowing through the process air line to the ambient air flowing through the ram air channel.

The heat exchanger unit may comprise a first heat exchanger and a second heat exchanger, wherein the second heat exchanger may be disposed within the process air line downstream of the first heat exchanger. The term "downstream," in this context, refers to a direction of flow of the process air through the process air line. Further, the second heat exchanger may be arranged within the ram air channel upstream of the first heat exchanger, wherein the term "upstream," in this context, refers to a direction of flow of the ambient air through the ram air channel. Hence, during operation of the aircraft air conditioning system, ambient air flowing through the ram air channel first may be guided through the second heat exchanger, before it is guided through the first heat exchanger. To the contrary, the process air flowing through the process air line may be first may be guided through the first heat exchanger, before it is guided through the second heat exchanger.

A compressor of a compressor/turbine unit may be disposed in the process air line between the first and the second heat exchanger of the heat exchanger unit in order to compress and thus reheat the process air flowing through the process air line after being cooled due to the transfer of thermal energy to the ambient air flowing through the ram air channel upon being directed through the first heat exchanger of the heat exchanger unit. The process air which is compressed and reheated in the compressor of the compressor/turbine unit, upon flowing through the second heat exchanger of the heat exchanger unit, may again be cooled by the transfer of thermal energy from the process air flowing through the process air line to the ambient air flowing through the ram air channel.

A water extractor of the aircraft air conditioning system is disposed in the process air line downstream of the heat exchanger unit so as to extract water from the process air flowing through the process air line. The term "downstream," in this context, refers to the direction of flow of the process air through the process air line. The water extractor may, for example, be designed in the form of a high pressure water extractor and may be disposed in the process air line downstream of at least one of a reheated and a condenser, i.e., the re-heater and/or the condenser may be disposed in the process air line between the heat exchanger unit, in particular the second heat exchanger of the heat exchanger unit and the water extractor. In case the water extractor is arranged in the process air line downstream of a condenser, the water extractor can particularly effectively remove liquid water from the process air stream flowing through the process air line upon being cooled not only in the heat exchanger unit, but also in the condenser.

Downstream of the water extractor, the process air line may be redirected through the re-heater so as to thermally couple the process air flowing through the process air line upstream of the water extractor to the process air flowing through the process air line downstream of the water extractor. Hence, within the re-heater, the process air flowing through the process air line upstream of the water extractor, prior to being supplied to the optional condenser and the water extractor, is cooled by the transfer of thermal energy to the process air flowing through the process air line downstream of the water extractor. After passing the water extractor and the re-heater, the process air may be supplied to a turbine of a compressor/turbine unit, wherein the process air is cooled and expanded. Downstream of the turbine, the process air line may extend through the condenser disposed between the re-heater and the water extractor so as to couple the process air flowing through the process air line upstream of the water extractor to the process air flowing through the process air line downstream of the turbine. Thus, in the condenser, the process air to be supplied to the water extractor may be cooled by the transfer of thermal energy to the process air flowing through the process air line exiting the turbine. Finally, the process air flowing through the process air line may be supplied to a mixing chamber of the air conditioning unit, wherein the process air may be mixed with recirculation air as desired. The terms "downstream" and "upstream," in this context, refer to the direction of flow of the process air through the process air line.

The aircraft air conditioning system further comprises a water supply system. The water supply system is adapted to supply water extracted from the process air flowing through the process air line by means of the water extractor into the ram air channel. By supplying water extracted from the process air into the ram air channel, the ambient air flowing through the ram air channel may be cooled, thus enhancing the cooling capacity of the ambient air flowing through the ram air channel. This is particularly advantageous when the aircraft air conditioning system is operated on the ground at high ambient temperatures. The water supply system, however, may cause a leakage of process air which, for example together with the water extracted from the process air by means of the water extractor, or also when no water is provided to the ram air channel from the water extractor, leaks from the process air line into the ram air channel and hence is lost for further use in the air conditioning unit of the air conditioning system. Further, bleed air pressure is required to convey the water extracted from the process air into the ram air channel.

The water supply system of the aircraft air conditioning system therefore further comprises a control arrangement which is adapted to control a fluid connection between the water extractor and the ram air channel in dependence on an operating state of the aircraft air conditioning system. The control arrangement of the water supply system thus, at least in certain operating states of the aircraft air conditioning system, may interrupt the fluid connection between the water extractor and the ram air channel. Hence, the supply of water extracted from the process air by means of the water extractor, but also the leakage of process air from the process air line and the consumption of bleed air for supplying the water extracted from the process air into the ram air channel may be prevented. The process air consumption of the air conditioning unit of the aircraft air conditioning system thus can be significantly reduced. In particular in case the process air line is supplied with process air from the engine or the APU of the aircraft equipped with the aircraft air conditioning system, considerably fuel savings can be realized. Consequently, the aircraft air conditioning system can be operated in a particularly cost-efficient and environmentally compatible manner.

In particular, the control arrangement of the water supply system may be adapted to control, i.e., to open or interrupt the fluid connection between the water extractor and the ram air channel in dependence on whether the cooling effect of the water supplied into the ram air channel or the suppression of a process air leakage from the process air line should be prioritized. This prioritization may depend on the operating state of the aircraft air conditioning system, i.e., in certain operating states of the aircraft air conditioning system the cooling effect of the water supplied into the ram air channel may be prioritized over the suppression of a process air leakage, whereas in other operating states of the aircraft air conditioning system the suppression of a process air leakage may be prioritized over the cooling effect of the water supplied into the ram air channel. Hence, in the aircraft air conditioning system, the beneficial effect of cooling the ambient air flowing through the ram air channel by the supply of water extracted from the process air flowing through the process air line by means of the water extractor can still be utilized, while simultaneously minimizing the leakage of process air from the process air line.

In a preferred embodiment of the aircraft air conditioning system, the control arrangement is adapted to control the fluid connection between the water extractor and the ram air channel in dependence on the humidity of the process air flowing through the process air line. In case the humidity of the process air flowing through the process air line is high, the amount of water extracted from the process air by means of the water extractor is also high and thus, by supplying the water extracted from the process air by means of the water extractor into the ram air channel, a considerable cooling effect for the ambient air flowing through the ram air channel can be achieved. To the contrary, in case the humidity of the process air flowing through the process air line is low, the amount of water extracted from the process air by means of the water extractor is also low and hence only a negligible cooling effect can be achieved by supplying the water extracted from the process air to the ram air channel. In summary, the higher the humidity of the process air flowing through the process air line, the more significant is the cooling effect for the ambient air flowing through the ram air channel achieved by the supply of water extracted from the process air by means of the water extractor into the ram air channel and the higher is the likelihood that the beneficial effect of cooling the ambient air flowing through the ram air channel outbalances the disadvantage of the leakage of process air from the process air line.

Alternatively or additionally thereto, the control arrangement may be adapted to control the fluid connection between the water extractor and the ram air channel in dependence on the operating altitude of the aircraft air conditioning system. The operating altitude of the aircraft air conditioning system significantly influences the humidity of the process air flowing through the process air line. Specifically, in case the aircraft air conditioning system is operated at high altitudes, for example while an aircraft equipped with the aircraft air conditioning system is flying at cruising altitude, the humidity of the process air flowing through the process air line is low, whereas, when the aircraft air conditioning system is operated on the ground, the humidity of the process air flowing through the process air line is high. Hence, the operating altitude of the aircraft air conditioning system can be used as a measure indicative of the humidity of the process air flowing through the process air line. Thus, the lower the operating altitude of the aircraft air conditioning system, the more significant is the cooling effect for the ambient air flowing through the ram air channel achieved by the supply of water extracted from the process air by means of the water extractor into the ram air channel and the higher is the likelihood that the beneficial effect of cooling the ambient air flowing through the ram air channel outbalances the disadvantage of the leakage of process air from the process air line.

Preferably, the control arrangement may be adapted to open the fluid connection between the water extractor and the ram air channel when the humidity of the process air flowing through the process air line exceeds a predetermined threshold value. The predetermined threshold value may be 1 g water per kg of process air. Alternatively or additionally thereto, the control arrangement may be adapted to open the fluid connection between the water extractor and the ram air channel when the operating altitude of the aircraft air conditioning system is below a predetermined threshold value. The predetermined threshold value may be 35000 feet (10668 m). In case the humidity of the process air flowing through the process air line exceeds a threshold value of 1 g water per kg of process air and/or in case the operating altitude of the aircraft air conditioning system is below a threshold value of 35000 feet (10668 m), the beneficial effect of cooling the ambient air flowing through the ram air channel by supplying water extracted from the process air by means of the water extractor is considered to outbalance the disadvantage of a process air leakage through the fluid connection between the water extractor and the ram air channel.

On the other hand, the control arrangement may be adapted to interrupt the fluid connection between the water extractor and the ram air channel when the humidity of the process air flowing through the process air is less than a predetermined threshold value. The predetermined threshold value may be 1 g water per kg of process air. Alternatively or additionally thereto, the control arrangement may be adapted to interrupt the fluid connection between the water extractor and the ram air channel when the operating altitude of the aircraft air conditioning system exceeds a predetermined threshold value. The predetermined threshold value may be 35000 ft (10668 m). At these operating conditions of the aircraft air conditioning system, the beneficial effect of cooling the ambient air flowing through the ram air channel by supplying water extracted from the process air by means of the water extractor into the ram air channel is considered to no longer outbalance the disadvantage of a process air leakage through the fluid connection between the water extractor and the ram air channel and the fluid connection between the water extractor and the ram air channel hence is interrupted.

The water supply system of the aircraft air conditioning system may comprise a water supply line having a first end connected to the water extractor. A second end of the water supply line may open into the ram air channel, in particular upstream of the heat exchanger unit. Specifically, the second end of the water supply line may open into the ram air channel upstream of the second heat exchanger of the heat exchanger unit, wherein, in this context, the term "upstream" refers to the direction of flow of the ambient air through the ram air channel. This arrangement of the second end of the water supply line ensures that the ambient air flowing through the ram air channel is cooled prior to flowing through the heat exchanger unit. The water supply line, in the region of the second end, may be provided with at least one spraying nozzle for spraying the water flowing through the water supply line into the ram air channel. A spraying nozzle provides for a uniform distribution of the water flowing through the process air line into the ram air channel. Preferably, a plurality of spraying nozzles is provided in the region of the second end of the water supply line, i.e., in a region of the water supply line which extends into the ram air channel.

The control arrangement of the water supply system may comprise a control valve which may be disposed in the water supply line, in particular between the water extractor and the ram air channel. In any case, the control valve should be disposed in the water supply line upstream of an opening of the water supply line into the ram air channel, wherein the term "upstream" in this context refers to a direction of flow of the water flowing through the water supply line.

The control valve disposed in the water supply line may be a shut-off valve which is adapted to be controlled into either of a fully open or a fully closed state. For example, the control valve may be designed in the form of an electrically driven fail-save-open solenoid relay that may be operated with a particularly high operational reliability.

The control arrangement of the water supply system may further comprise a control unit, in particular an electronic control unit, which is adapted to receive signals indicative of the operating state of the air conditioning system. The signals may be provided to the control unit, for example, from suitable sensors, for example a humidity sensor which may be arranged in the process air line or a sensor, for example a pressure sensor or the like, which is adapted to measure the operating altitude of the aircraft air conditioning system. Further, the control unit of the control arrangement may be adapted to control the fluid connection between the water extractor and the ram air channel, in particular the operation of the control valve disposed in the water supply line, in dependence on said signals indicative of the operating state of the aircraft air conditioning system. Hence, the electronic control unit provides for a reliable control of the fluid connection between the water extractor and the ram air channel in dependence on the operating state of the aircraft air conditioning system.

In a method of operating an aircraft air conditioning system, a flow of process air supplied from a process air source is directed through a process air line having a first end which is connectable to the process air source. A flow of ambient air is directed through a ram air channel. The process air flowing through the process air line is thermally coupled to the ambient air flowing through the ram air channel in a heat exchanger unit which is disposed in the process air line and arranged within the ram air channel. Water is extracted from the process air flowing through the process air line by means of a water extractor disclosed in the process air line downstream of the heat exchanger unit, wherein the term "downstream" in this context refers to the direction of flow of the process air through the process air line. A fluid connection between the water extractor and the ram air channel is controlled in dependence of an operating state of the aircraft air conditioning system.

The fluid connection between the water extractor and the ram air channel may be controlled in dependence on the humidity of the process air flowing through the process air line. Alternatively or additionally thereto, the fluid connection between the water extractor and the ram air channel may be controlled in dependence on the operating altitude of the aircraft air conditioning system.

The fluid connection between the water extractor and the ram air channel may be opened when the humidity of the process air flowing through the process air line exceeds a predetermined threshold value. The predetermined threshold value may be 1 g water per kg of process air. Alternatively or additionally thereto, the fluid connection between the water extractor and the ram air channel may be opened when the operating altitude of the aircraft air conditioning system is below a predetermined threshold value. The predetermined threshold value for the operating altitude of the aircraft air conditioning system may be 35000 ft (10668 m).

The fluid connection between the water extractor and the ram air channel may be interrupted when the humidity of the process air flowing through the process air line is below a predetermined threshold value. The predetermined threshold value may be 1 g water per kg of process air. Alternatively or additionally thereto, the fluid connection between the water extractor and the ram air channel may be interrupted when the operating altitude of the aircraft air conditioning system exceeds a predetermined threshold value. The predetermined threshold value for the operating altitude of the aircraft air conditioning system may be 35000 ft (10668 m).

The water extracted from the process air flowing through the process air line by means of the water extractor may be supplied into the ram air channel by means of a water supply system. The water supply system may comprise a water supply line having a first end connected to the water extractor and a second end opening into the ram air channel, in particular upstream of the heat exchanger unit, wherein the term "upstream" in this context refers to the direction of flow of ambient air through the ram air channel. The water supply line, in the region of a second end, preferably is provided with at least one spraying nozzle for spraying the water flowing through the water supply line into the ram air channel.

The fluid connection between the water extractor and the ram air channel may be controlled by means of a control arrangement of the water supply system, wherein the control arrangement may comprise a control valve disposed in the water supply line, in particular between the water extractor and the ram air channel.

The control valve disposed in the water supply line may be a shut-off valve which may be controlled into either a fully open or a fully closed state.

A control unit of the control arrangement may receive signals indicative of the operating state of the aircraft air conditioning system and may control the fluid connection between the water extractor and the ram air channel, in particular the operation of the control valve disposed in the water supply line, in dependence on said signals indicative of the operating state of the aircraft air conditioning system.

BRIEF DESCRIPTION OF THE DRAWINGS

A preferred embodiment of the invention now is described in greater detail with reference to the appended schematic drawing, wherein The FIGURE shows a schematic representation of an aircraft air conditioning system.

DETAILED DESCRIPTION OF THE PREFERRED EMBODIMENTS

The FIGURE shows an aircraft air conditioning system 10 comprising a process air line 12 which, during operation of the aircraft air conditioning system 10, is flow through with hot compressed process air. A first end of the process air line 12 is connected to a process air source 14 which, for example, may be an engine or an APU of an aircraft equipped with the air conditioning system 10. The process air bled off from the process air source 14 is directed to a volatile organic compound and ozone converter 16 which is disposed in the process air line 12. A pack flow sensor 18 serves to measure the volume flow of process air flowing through the process air line 12 and a flow control valve 20 serves to control the flow of process air through the process air line in dependence on the actual volume flow of process air measured by means of the pack flow sensor 18. In particular, the flow control valve 20 serves to control the supply of process air from the process air source 14 to an air conditioning unit 22 of the air conditioning system 10. A trim air line 24 branches off from the process air line 12 between the flow control valve 20 and the air conditioning unit 22.

The air conditioning unit 22 comprises a heat exchanger unit 26 which, in the exemplary embodiment of an aircraft air conditioning system 10 depicted in the FIGURE, comprises a first heat exchanger 28 and a second heat exchanger 30. The first and the second heat exchanger 28, 30 of the heat exchanger unit 26 are disposed in the process air line 12 and, furthermore, are arranged within a ram air channel 32. During operation of the aircraft air conditioning system 10, ambient air flows through the ram air channel 32, wherein the flow of ambient air through the ram air channel 32 is controlled by means of a ram air channel inlet flap 34 and a ram air channel outlet flap 36. In particular, the flow of ambient air through the ram air channel 32 is controlled by appropriately controlling the ram air channel inlet flap 34 and the ram air channel outlet flap 36 between a closed position and an open position.

During flight operation of an aircraft equipped with the aircraft air conditioning system 10, the flow of ambient air through the ram air channel 32 is induced by a ram pressure prevailing in an inlet region of the ram air channel 32. During ground operation of the aircraft, ambient air is conveyed through the ram air channel 32 by means of a conveying device 38 which is disposed in the ram air channel 32 downstream of the heat exchanger unit 26, wherein the term "downstream," in this context, refers to the direction of flow of the ambient air through the ram air channel 32. The conveying device 38 is designed in the form of a blower and is driven by means of a compressor/turbine unit 40 of the aircraft air conditioning unit 22 which will be described in greater detail below. In particular, the conveying device 38 and the compressor/turbine unit 40 are disposed on a common shaft.

Process air flowing through the process air line 12, in the first heat exchanger 28 of the heat exchanger unit 26, is brought into thermal contact with the ambient air flowing through the ram air channel 32 and thus is cooled by the transfer of thermal energy to the ambient air flowing through the ram air channel 32. Downstream of the first heat exchanger 28, the process air line 12 extends to a compressor 42 of the compressor/turbine unit 40, wherein the term "downstream," in this context, refers to the direction of flow of the process air through the process air line 12. Within the compressor 42, the process air is compressed and heated.

Process air exiting the compressor 42, via the process air line 12, is supplied to the second heat exchanger 30 of the heat exchanger unit 26. Upon flowing through the second heat exchanger 30, the process air again is cooled by the transfer of thermal energy to the ambient air flowing through the ram air channel 32. Process air exiting the second heat exchanger 30, via the process air line 12, then is directed to a re-heater 44 and thereafter to a condenser 46. Downstream of the condenser 46, a water extractor 48 is disposed in the process air line 12, wherein the term "downstream," in this context, refers to the direction of flow of the process air through the process air line 12.

The water extractor 48 serves to extract liquid water from the process air flowing through the process air line 12. Process air exiting the water extractor 48 is directed through the re-heater 44 and thereafter to a turbine 50 of the compressor/turbine unit 40. In the re-heater 44, the process air exiting the water extractor 48 is brought into contact with the process air flowing through the process air line 12 prior to being supplied to the condenser 46. In the re-heater 44, the process air to be supplied to the condenser 46 thus is cooled by the transfer of thermal energy to the process air flowing through the process air line 12 downstream of the water extractor 48, wherein the term "downstream," in this context, again refers to the direction of flow of the process air through the process air line 12.

After being expanded and thus cooled in the turbine 50 of the compressor/turbine unit 40, the process air, via the process air line 12, is directed through the condenser 46 so as to cool the condenser 46. Finally, the process air exiting the condenser 46, downstream of the turbine 50, exits the air conditioning unit 22 and is supplied to a mixing chamber (not shown in the FIGURE) of the aircraft air conditioning system 10. The supply of process air from the air conditioning unit 22 to the mixing chamber is controlled by means of an outlet valve 52 which is disposed in the process air line 12 downstream of the condenser 46, wherein the term "downstream," in this context, again refers to the direction of flow of process air through the process air line 12.

A bypass line 54 branches off from the process air line 12 upstream of the compressor 42 of the compressor/turbine unit 40 and again opens into the process air line 12 downstream of the turbine 50 of the compressor/turbine unit 40. A temperature control valve 56 is disposed in the bypass line 54 and serves to control the flow of process air which is branched off from the process air line 12 upstream of the compressor 42 and again supplied into the process air line 12 downstream of the turbine 50. By suitably controlling the temperature control valve 56, the temperature of the process air flowing through the process air line 12 downstream of the turbine 50 can be controlled as desired. In particular, the process air flowing through the process air line 12 downstream of the turbine 50 can be heated by supplying hot process air flowing through the process air line 12 upstream of the compressor 42 by appropriately opening the temperature control valve 56. The terms "downstream" and "upstream," in this context, refer to the direction of flow of process air through the process air line 12.

The air conditioning system 10 further comprises a water supply system 58 which serves to supply water extracted from the process air flowing through the process air line 12 by means of the water extractor 48 into the ram air channel 32. By supplying water extracted from the process air by means of the water extractor 48, the ambient air flowing through the ram air channel 32 can be cooled, the cooling effect of the water supplied into the ram air channel 32 being in particular beneficial when the ambient air flowing through the ram air channel 32 is relatively warm, i.e., for example, when the aircraft air conditioning system 10 is operated on the ground at high ambient temperatures.

The water supply system 58 comprises a water supply line 60 having a first end connected to the water extractor 48. A second end of the water supply line 60 opens into the ram air channel 32 upstream of the second heat exchanger 30 of the heat exchanger unit 26, wherein the term "upstream," in this context, refers to the direction of flow of ambient air through the ram air channel 32. This arrangement allows an appropriate cooling of the ambient air flowing through the ram air channel 32 prior to directing the ambient air through the first and thereafter through the second heat exchanger 28, 30 of the heat exchanger unit 26. In the region of its second end, the water supply line 60 is provided with spraying nozzles 62 which serve to spray the water flowing through the water supply line 60 into the ram air channel 32. In particular, the spraying nozzles 62 are arranged in a region of the water supply line 60 which extends into the ram air channel 32. The spraying nozzles 62 provide for a uniform distribution of the water supplied to the ram air channel 32 via the water supply line 60 within the ram air channel 32.

The water supply system 58, however, may cause a leakage of process air which, for example together with the water extracted from the process air by means of the water extractor 48, or also when no water is provided to the ram air channel 32 from the water extractor 48, leaks from the process air line into the ram air channel 32 and hence is lost for further use in the air conditioning unit of the air conditioning system 10. Further, bleed air pressure is required to convey the water extracted from the process air into the ram air channel 32. In order to minimize the leakage of process air from the air conditioning unit 22 and also the consumption of bleed air for supplying the water extracted from the process air into the ram air channel 32, the water supply system 58 is provided with a control arrangement 64 which is adapted to control a fluid connection between the water extractor 48 and the ram air channel 32 in dependence on an operating state of the aircraft air conditioning system 10.

In particular, the control arrangement 64 is adapted to control the fluid connection between the water extractor 48 and the ram air channel 32 in dependence on the operating altitude of the aircraft air conditioning system 10 and hence in dependence on the humidity of the process air flowing through the process air line 12. Specifically, the control arrangement is adapted to open the fluid connection between the water extractor 48 and the ram air channel 32 when the operating altitude of the aircraft air conditioning system 10 is less than 35000 ft (10668 m) and hence the humidity of the process air flowing through the process air line 12 exceeds 1 g water per kg of process air. To the contrary, the control arrangement 64 is adapted to interrupt the fluid connection between the water extractor 48 and the ram air channel 32 when the aircraft air conditioning system 10 is operated at an operating altitude above 35000 ft (10688 m) and hence the humidity of the process air flowing through the process air line is less than 1 g water per kg of process air.

The control arrangement 64 comprises a control valve 66 which is disposed in the water supply line 60 between the water extractor 48 and the ram air channel 32. In particular, the control valve 66 is disposed in the water supply line 60 upstream of the spraying nozzles 62 provided in the region of the second end of the water supply line 60, wherein the term "upstream," in this context, refers to the direction of flow of the water flowing through the water supply line 60. The control valve 66 is designed in the form of a shut-off valve which is adapted to be controlled into either a fully open or a fully closed state. In particular, the control valve 66 is designed in the form of an electrically driven fail-save-open solenoid relay.

The control arrangement 64 further comprises a control unit 68 which is designed in the form of an electronic control unit and which it is adapted to receive signals indicative of an operating state of the aircraft air conditioning system 10. In particular, the control unit 68 receives signals which are indicative of the operating altitude of the aircraft air conditioning system 10 and controls the operation of the control valve 66 in dependence on said signals. Specifically, the control unit 68 controls the control valve 66 into its closed state when the signals provided to the control unit 68 indicate that the aircraft air conditioning system 10 is operated at an operating altitude of less than 35000 ft (10668 m), i.e., when an aircraft equipped with the aircraft air conditioning system 10 is operated on the ground or flying at an altitude below cruising altitude. To the contrary, the control unit 68 controls the control valve 66 into its closed position when the signals provided to the control unit 68 indicate that the aircraft air conditioning system 10 is operated at an operating altitude of more than 35000 ft (10668 m), i.e., when an aircraft equipped with the aircraft air conditioning system 10 is flying at cruising altitude.

Hence, in operating states of the aircraft air conditioning system 10 wherein the beneficial effect of cooling the ambient air flowing through the ram air channel 32 by supplying water extracted from the process air by means of the water extractor 48 into the ram air channel 32 does not outbalance the disadvantage that process air leaks from the process air line 12 via the water supply line 60, the fluid connection between the water extractor 48 and the ram air channel 32 is interrupted by closing the control valve 66. Hence, the leakage of process air from the process air line 12 is reliably prevented. The aircraft air conditioning system 10 thus distinguishes by a particularly low consumption of process air.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft air conditioning system comprising:
a process air line having a first end connected to a process air source allowing a flow of process air supplied from the process air source therethrough,
a ram air channel configured to allow a flow of ambient air therethrough,
a heat exchanger unit disposed in the process air line and arranged within the ram air channel to thermally couple the process air flowing through the process air line to the ambient air flowing through the ram air channel,
a water extractor disposed in the process air line, downstream of the heat exchanger unit, so as to extract water from the process air flowing through the process air line, and
a water supply system adapted to supply water, extracted from the process air flowing through the process air line via the water extractor, into the ram air channel, the water supply system comprising a control arrangement adapted to control a fluid connection downstream of the water extractor into the ram air channel in dependence on whether a cooling effect of the water supplied into the ram air channel or a suppression of a process air leakage from the process air line into the ram air channel is to be prioritized.

2. The aircraft air conditioning system according to claim 1, wherein the control arrangement is adapted to control the fluid connection between the water extractor and the ram air channel in dependence on at least one of a humidity of the process air flowing through the process air line and an operating altitude of the aircraft air conditioning system.

3. The aircraft air conditioning system according to claim 1, wherein the control arrangement is adapted to open the fluid connection between the water extractor and the ram air channel when a humidity of the process air flowing through the process air line exceeds a predetermined threshold value.

4. The aircraft air conditioning system according to claim 1, wherein the control arrangement is adapted to open the fluid connection between the water extractor and the ram air channel when an operating altitude of the aircraft air conditioning system is below a predetermined threshold value.

5. The aircraft air conditioning system according to claim 1, wherein the control arrangement is adapted to interrupt the fluid connection between the water extractor and the ram air channel when a humidity of the process air flowing through the process air line is below a predetermined threshold value.

6. The aircraft air conditioning system according to claim 1, wherein the control arrangement is adapted to interrupt the fluid connection between the water extractor and the ram air channel when an operating altitude of the aircraft air conditioning system exceeds a predetermined threshold value.

7. The aircraft air conditioning system according to claim 1, wherein the water supply system comprises a water supply line having a first end connected to the water extractor and a second end opening into the ram air channel, upstream of the heat exchanger unit, wherein the water supply line, in the region of said water supply's second end, is provided with at least one spraying nozzle for spraying the water flowing through the water supply line into the ram air channel.

8. The aircraft air conditioning system according to claim 7, wherein the control arrangement comprises a control valve disposed in the water supply line, in particular between the water extractor and the ram air channel.

9. The aircraft air conditioning system according to claim 8, wherein the control valve disposed in the water supply line is a shut-off valve which is adapted to be controlled into either a fully open or a fully closed state.

10. The aircraft air conditioning system according to claim 7, wherein the control arrangement comprises a control unit which is adapted to receive signals indicative of whether the cooling effect of the water supplied into the ram air channel or the suppression of the process air leakage from the process air line into the ram air channel is to be prioritized and which further is adapted to control the fluid connection between the water extractor and the ram air channel, by controlling the operation of a control valve disposed in the water supply line, in dependence on said signals.

11. A method of operating an aircraft air conditioning system, the method comprising:
    directing a flow of process air supplied from a process air source through a process air line having a first end which is connectable to the process air source,
    directing a flow of ambient air through a ram air channel,
    thermally coupling the process air flowing through the process air line to the ambient air flowing through the ram air channel in a heat exchanger unit which is disposed in the process air line and arranged within the ram air channel,
    extracting water from the process air flowing through the process air line via a water extractor disposed in the process air line downstream of the heat exchanger unit, and
    controlling a fluid connection between the water extractor and the ram air channel in dependence on whether a cooling effect of the water supplied into the ram air channel or a suppression of a process air leakage from the process air line into the ram air channel is to be prioritized.

12. The method according to claim 11, wherein the fluid connection between the water extractor and the ram air channel is controlled in dependence on at least one of a humidity of the process air flowing through the process air line and an operating altitude of the aircraft air conditioning system.

13. The method according to claim 11, wherein the fluid connection between the water extractor and the ram air channel is opened when a humidity of the process air flowing through the process air line exceeds a predetermined threshold value.

14. The method according to claim 11, wherein the fluid connection between the water extractor and the ram air channel is opened when an operating altitude of the aircraft air conditioning system is below a predetermined threshold value.

15. The method according to claim 11, wherein the fluid connection between the water extractor and the ram air channel is interrupted when a humidity of the process air flowing through the process air line below a predetermined threshold value.

16. The method according to claim 11, wherein the fluid connection between the water extractor and the ram air channel is interrupted when an operating altitude of the aircraft air conditioning system exceeds a predetermined threshold value.

17. The method according to claim 11, wherein the water extracted from the process air flowing through the process air line via the water extractor is supplied into the ram air channel via a water supply system, wherein the water supply system comprises a water supply line having a first end connected to the water extractor and a second end opening into the ram air channel, upstream of the heat exchanger unit, wherein the water supply line, in the region of its second end, is provided with at least one spraying nozzle for spraying the water flowing through the water supply line into the ram air channel.

18. The method according to claim 11, wherein the fluid connection between the water extractor and the ram air channel is controlled by means of a control arrangement of the water supply system, the control arrangement comprising a control valve disposed in the water supply line, between the water extractor and the ram air channel.

19. The method according to claim 17, wherein the control valve disposed in the water supply line is a shut-off valve which is controlled into either a fully open or a fully closed state.

20. The aircraft air conditioning system according to claim 1, wherein the process air is utilized to convey the water extracted from the process air into the ram air channel.

* * * * *